United States Patent
Usui et al.

(10) Patent No.: US 11,171,776 B2
(45) Date of Patent: Nov. 9, 2021

(54) ENCRYPTION KEY DISTRIBUTION SYSTEM, KEY DISTRIBUTION ECU AND KEY RECEPTION ECU

(71) Applicant: FUJITSU LIMITED, Kawasaki (JP)

(72) Inventors: Kenta Usui, Kawasaki (JP); Yasuhiko Abe, Niiza (JP); Naoki Suzuki, Yamato (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/526,904

(22) Filed: Jul. 30, 2019

(65) Prior Publication Data
US 2019/0356477 A1  Nov. 21, 2019

Related U.S. Application Data

(63) Continuation of application No. PCT/JP2017/003596, filed on Feb. 1, 2017.

(51) Int. Cl.
*H04L 9/08* (2006.01)
*H04L 9/32* (2006.01)

(52) U.S. Cl.
CPC .......... *H04L 9/083* (2013.01); *H04L 9/3242* (2013.01)

(58) Field of Classification Search
CPC ........ G06F 21/45; G06F 1/3225; G06F 3/067; G06F 9/544; H04L 9/083; H04L 67/04;
(Continued)

(56) References Cited

U.S. PATENT DOCUMENTS

2004/0125793 A1* 7/2004 Yi ..................... H04L 67/04
370/352
2011/0159806 A1  6/2011 Yamada et al.
(Continued)

FOREIGN PATENT DOCUMENTS

| JP | 2011-139186 | 7/2011 |
| JP | 2013-98719 | 5/2013 |
| WO | 2016/093368 | 6/2016 |

OTHER PUBLICATIONS

Japanese Office Action dated Oct. 15, 2019 for corresponding Japanese Patent Application No. 2018-565137 with Machine Translation.
(Continued)

*Primary Examiner* — Chau Le
*Assistant Examiner* — Andrew Suh
(74) *Attorney, Agent, or Firm* — Maschoff Brennan

(57) ABSTRACT

An encryption key distribution system includes: a key distribution ECU that transmits an encryption key; and a key reception ECU that receives the encryption key, the key distribution ECU: transmits the encryption key to the key reception ECU; and determines completion of transmission of the encryption key, based on a result of determination as to whether first verification data transmitted from the key reception ECU matches second verification data of the encryption key which is calculated from a common key stored in the key distribution ECU and an identifier of the key reception ECU, the key reception ECU: records the received encryption key in the key reception ECU; calculates the first verification data from the same common key as the common key stored in the key reception ECU and the identifier of the key reception ECU; and transmits the calculated first verification data to the key distribution ECU.

11 Claims, 13 Drawing Sheets

(58) Field of Classification Search
CPC . H04L 12/189; H04L 12/4013; H04L 63/061; H04L 63/06; H04L 67/12; H04L 63/123; H04L 67/1097; H04L 9/3242; H04L 63/062; H04L 9/0833; H04L 2209/84; H04L 9/0891; H04L 9/321
See application file for complete search history.

(56) References Cited

U.S. PATENT DOCUMENTS

| | | |
|---|---|---|
| 2014/0310530 A1 | 10/2014 | Oguma et al. |
| 2016/0315766 A1* | 10/2016 | Ujiie ............... H04L 9/088 |
| 2017/0134164 A1* | 5/2017 | Haga ............... G06F 21/572 |
| 2018/0288000 A1* | 10/2018 | Inoue ............... H04L 12/40169 |
| 2019/0084580 A1* | 3/2019 | Kodama ........... H04L 63/0227 |

OTHER PUBLICATIONS

Takeshi Sugashima et al., "Approaches for Secure and Efficient In-Vehicle Key Management", SCIS2016, pp. 1-6, Jan. 2016 Cited in ISR.
Keisuke Takemori et al., "In-Vehicle Network Security Using Secure Element", IEICE Transactions on Fundamenals of Electronics, Communications and Computer Sciences, vol. E99-A No. I, pp. 208-216, Jan. 1, 2016 Searched on Apr. 13, 2017, Internet <URL: http://search.ieice.org/bin/pdf.php?lang=E&year=2016&fname=e99-a_1_208&abst=> Cited in ISR.
Hideaki Kawabata et al. "A Key Management Framework for Automotive ECUs", SCIS2016, pp. 1-7, Jan. 2016 Cited in ISR.
Geoff Emerson et al., "Using the Cryptographic Service Engine (CSE)", Freescal Semiconductor, Freescale Semiconductor. Inc., AN4234 Rev: 0, Jun. 2011, pp. 1-28, 2011 Searched on Apr. 13, 2017, Internet <URL : http://cache.freescale.com/files/32bit/doc/app_note/AN4234.pdf> Cited in ISR.
International Search Report and its English Translation Written Opinion and English Translation of Relevant Part.

\* cited by examiner

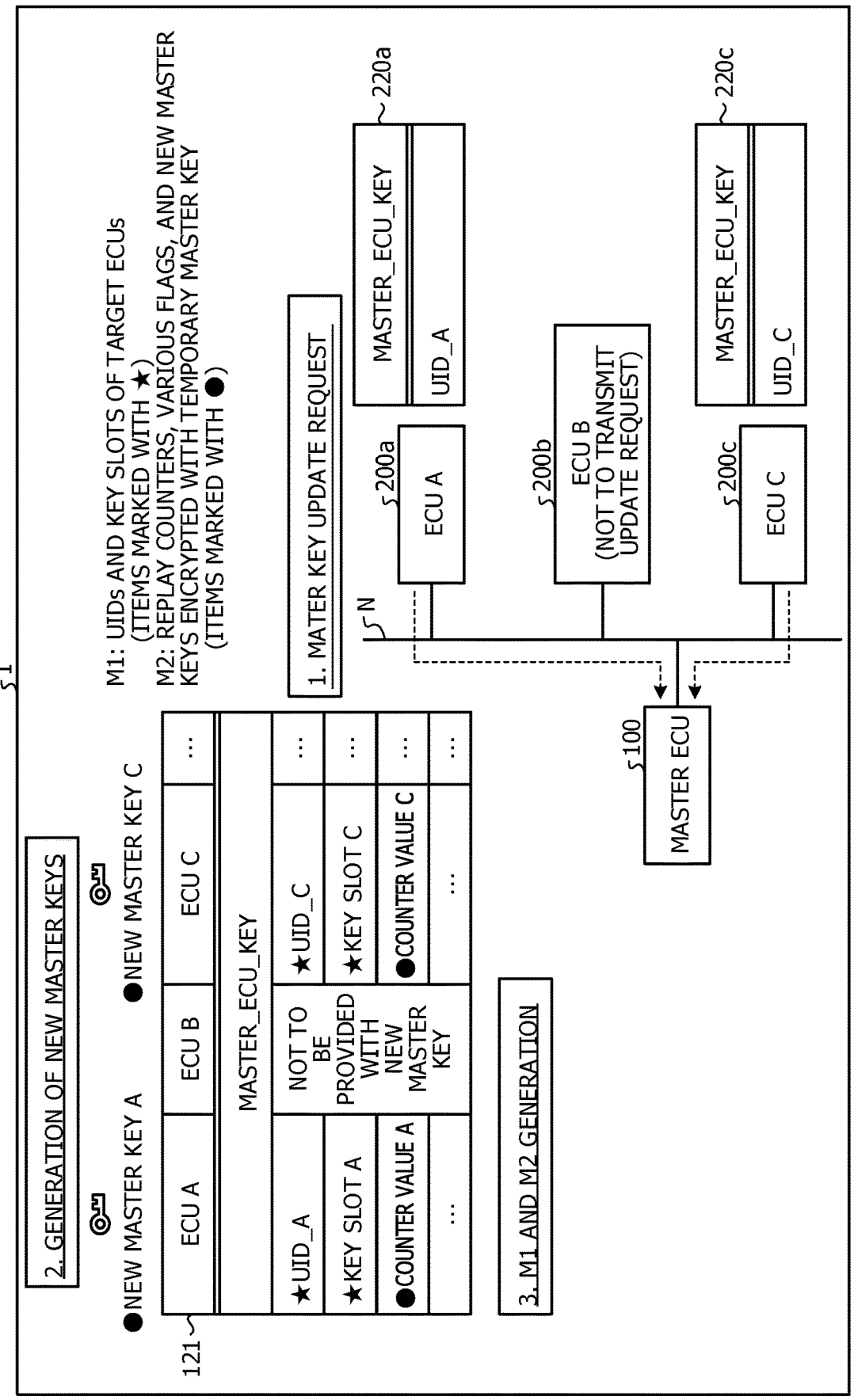

FIG. 7

| RECEPTION ORDER | COMPARISON TARGETS | | BRUTE-FORCE COMPARISON CANDIDATES | | | | |
|---|---|---|---|---|---|---|---|
| | UID | MAC VALUE | | | | | |
| 1 | UID_D | M5 (MAC VALUE D) | MAC VALUE D' | MAC VALUE E' | MAC VALUE F' | MAC VALUE G' | MAC VALUE H' |
| 2 | UID_E | M5 (MAC VALUE E) | - | MAC VALUE E' | MAC VALUE F' | MAC VALUE G' | MAC VALUE H' |
| 3 | UID_F | M5 (MAC VALUE F) | - | - | MAC VALUE F' | MAC VALUE G' | MAC VALUE H' |
| 4 | UID_G | M5 (MAC VALUE G) | - | - | - | MAC VALUE G' | MAC VALUE H' |
| 5 | UID_H | M5 (MAC VALUE H) | - | - | - | - | MAC VALUE H' |
| - | - | - | KEY DISTRIBUTION COMPLETION | | | | |

ENCRYPTION KEY DISTRIBUTION SYSTEM, KEY DISTRIBUTION ECU AND KEY RECEPTION ECU

CROSS-REFERENCE TO RELATED APPLICATION

This application is a continuation application of International Application PCT/JP2017/003596 filed on Feb. 1, 2017 and designated the U.S., the entire contents of which are incorporated herein by reference.

FIELD

The embodiments discussed herein are related to an encryption key distribution system, a key distribution ECU, a key reception ECU, a key distribution program, a key reception program, and an encryption key distribution method.

BACKGROUND

A secure data transfer are performed between a plurality of electronic control units (ECUs) that are mounted in an automobile or the like, and are connected via a controller area network (CAN).

Japanese Laid-open Patent Publication No. 2013-098719 and Sugashima, Oka, and Vuillaume, "Approaches for Secure and Efficient In-Vehicle Key Management", Transactions of the Institute of Electronics, Information and Communication Engineers 2016 are disclosed as related art.

SUMMARY

According to an aspect of the embodiments, an encryption key distribution system includes: a key distribution electronic control unit (ECU) that transmits an encryption key; and a key reception electronic control unit (ECU) that receives the encryption key, the key distribution ECU is configured to: transmit the encryption key to the key reception ECU; and determine completion of transmission of the encryption key to the key reception ECU, based on a result of determination as to whether first verification data which is transmitted from the key reception ECU matches second verification data of the encryption key, the second verification data of the encryption key being calculated from a common key which is stored in the key distribution ECU and an identifier of the key reception ECU, the key reception ECU is configured to: record the received encryption key in the key reception ECU; calculate the first verification data of the received encryption key from the same common key as the common key stored in the key reception ECU and the identifier of the key reception ECU; and transmit the calculated first verification data to the key distribution ECU.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2A is a diagram illustrating an example of an encryption key distribution process according to the first embodiment;

FIG. 7 is a diagram illustrating an example of a brute-force comparison process according to the first embodiment.

DESCRIPTION OF EMBODIMENTS

For example, a transmission-side ECU transmits a message authentication code (MAC) generated from a message data field, a message ID, and a count value indicating the number of times a message has been transmitted.

For example, an encryption key is shared between ECUs. In a case where an encryption key is updated, a master ECU that distributes encryption keys transmits an UID that is the identifier (ID) of the target ECU of the key update, and M1 that is a message indicating a key slot. The master ECU further transmits a replay prevention counter, various flags, M2 that is a message formed by encrypting a new encryption key, and M3 that is an MAC calculated for M1 and M2.

In this case, upon receipt of M1, M2, and M3, the target ECU that receives encryption keys first verifies the MAC of M1 and M2, using M3. In a case where the result of the MAC verification is acceptable, the target ECU decrypts the encryption key, and stores the decrypted key into the encryption key slot. The target ECU also generates M4 that is a message formed with the UID of the target ECU, the encryption key slot, and the encrypted replay prevention counter, and transmits the M4, together with M5 as an MAC of the M4, to the master ECU. The master ECU performs MAC verification on the received M4, using the received M5.

However, the information indicating receipt of an encryption key has a large data size, and therefore, the communication volume to be used for key update might become larger. For example, M4 transmitted from a target ECU to the master ECU is 32 bytes, and M5 is 16 bytes, both of which are larger than 8 bytes, which is the size that can be transmitted by one CAN packet.

An encryption key distribution system, a key distribution ECU, a key reception ECU, a key distribution program, a key reception program, and an encryption key distribution method capable of reducing the amount of data to be used for key update may be provided.

The following is a detailed description of embodiments of an encryption key distribution system, a key distribution ECU, a key reception ECU, a key distribution program, a key reception program, and an encryption key distribution method disclosed in the present application, with reference to the drawings. Note that the present invention is not limited by these embodiments. The embodiments described below may also be combined as appropriate, without departing from the scope of the invention.

First Embodiment

Figure 1:
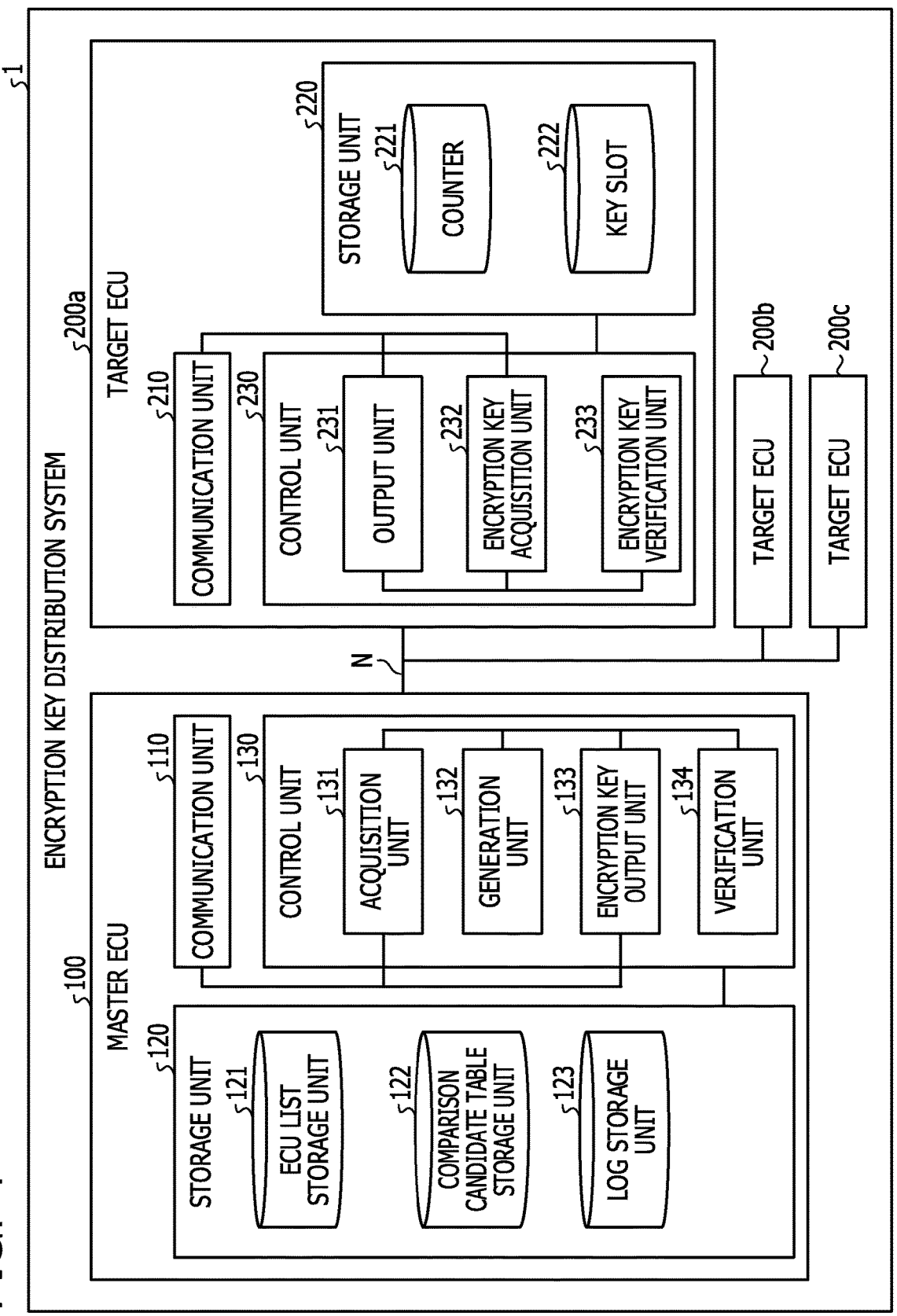
FIG. 1 is a diagram illustrating an example of an encryption key distribution system according to a first embodiment.

First, an example of an encryption key distribution system according to this embodiment is described with reference to FIG. 1. FIG. 1 is a diagram illustrating an example of an encryption key distribution system according to a first embodiment. As illustrated in FIG. 1, an encryption key distribution system 1 according to this embodiment includes a master ECU 100, a target ECU 200a, a target ECU 200b, and a target ECU 200c. In the description below, the target ECU 200a, the target ECU 200b, and the target ECU 200c may be described as "target ECUs 200" unless distinguished from one another. The master ECU 100 and the target ECUs 200 are communicably connected to one another by a network N such as a CAN, for example.

The master ECU 100 in this embodiment is a device that distributes an encryption key to each target ECU. The master ECU 100 may be formed with a computer including a processor and a memory, for example. The master ECU 100 is an example of a key distribution ECU.

Each target ECU 200 in this embodiment is a device that receives an encryption key distributed by the master ECU 100. Like the master ECU 100, each target ECU 200 may also be formed with a computer including a processor and a memory, for example. As illustrated in FIG. 1, each target ECU 200 includes a communication unit 210, a storage unit 220, and a control unit 230. Each target ECU 200 is an example of a key reception ECU. Further, in the description below, in a case where each of the functional blocks of the respective target ECUs 200 is distinguished from a corresponding functional block of other target ECUs 200, the functional blocks may be described as "the storage unit 220a", "the storage unit 220c", and the like, for example.

Encryption Key Distribution Process

Figure 2B:
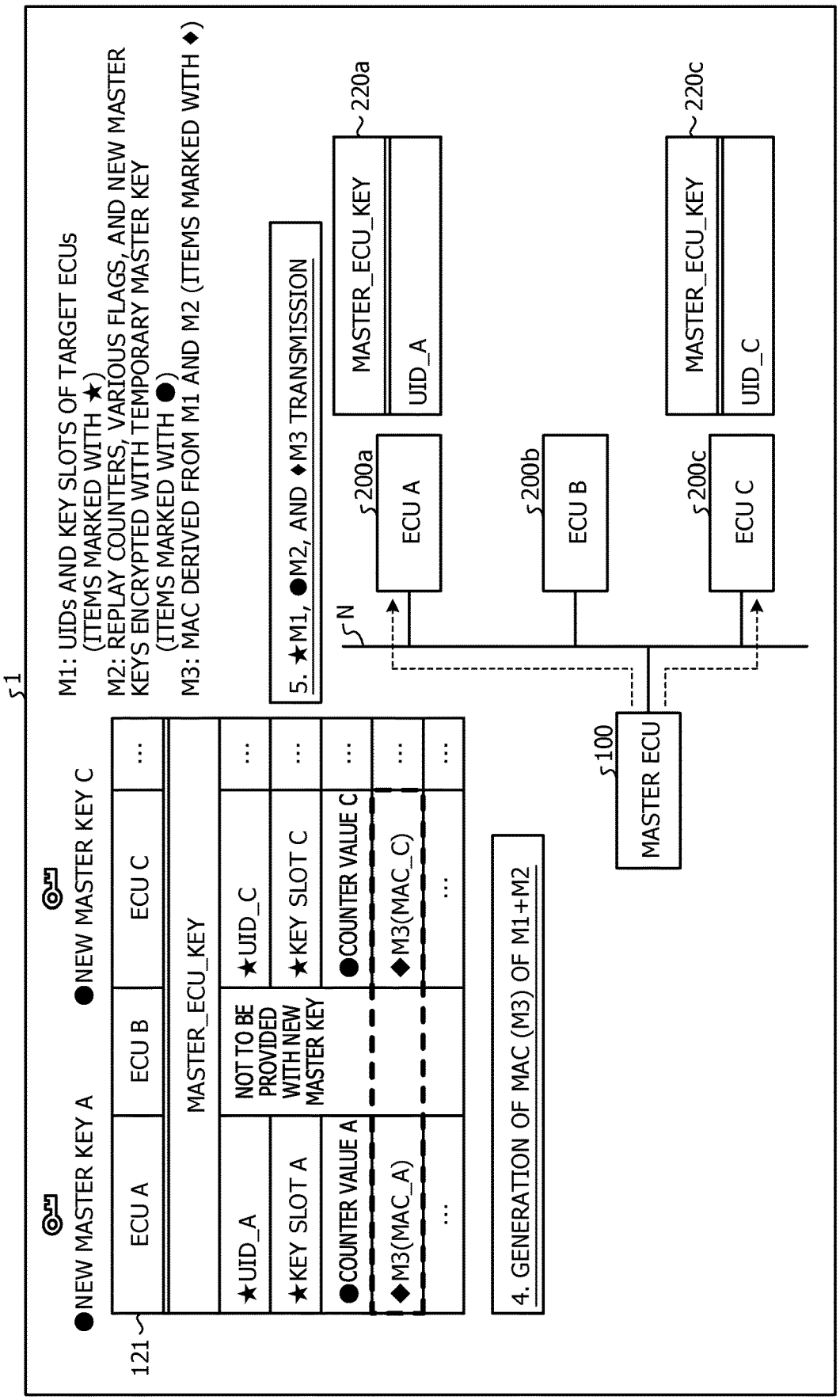
FIG. 2B is a diagram illustrating an example of an encryption key distribution process according to the first embodiment.

Next, a process of distributing master keys in the encryption key distribution system 1 is described with reference to FIGS. 2A through 2F. FIGS. 2A through 2F are diagrams illustrating an example of an encryption key distribution process according to the first embodiment. As illustrated in FIG. 2A, the master ECU 100 (MASTER ECU) is communicably connected to the target ECU 200a (ECU A), the target ECU 200b (ECU B), and the target ECU 200c (ECU C) through the network N. A master key is an example of an encryption key.

Each target ECU 200 is assigned a UID that is an identifier (ID) for uniquely identifying the target ECU 200. For example, as illustrated in FIG. 2A, the UID of the target ECU 200a is "UID_A", and the UID of the target ECU 200c is "UID_C". The UIDs are stored in the storage units 220a and 220c of the respective target ECUs 200, for example. Each UID is an example of the identifier of the key reception ECU.

Further, each target ECU 200 stores a master key distributed from the master ECU 100 in a predetermined key slot. Furthermore, in this embodiment, the master ECU 100 and the target ECUs 200 each store a replay counter value that is information for detecting a retransmission attack.

First, as illustrated in FIG. 2A, out of the target ECUs 200, the target ECU 200a and the target ECU 200c both transmit a master key update request to the master ECU 100 (1. Master key update request). Note that the target ECU 200b does not transmit any master key update request, as illustrated in FIG. 2A. In this case, the target ECUs 200 that transmit the master key update request and the master ECU 100 share beforehand a temporary master key to be used for distribution of a new master key. The temporary master key is an example of a common key.

Upon receipt of the master key update request, the master ECU 100 identifies the target ECU 200a and the target ECU 200c, which are the target ECUs 200 that have transmitted the master key update request. The master ECU 100 then generates a new master key for each of the target ECU 200a and the target ECU 200c (2. Generation of new master keys). The master ECU 100 sequentially stores generated messages and the like into an ECU list storage unit 121.

The master ECU 100 then generates a message M1, using the UIDs of the target ECUs 200 that have transmitted the master key update request, and the key slots of the respective target ECUs 200. The master ECU 100 also generates a message M2, using the replay counter values, various flags to be used for other master key distribution processes, and the new master keys encrypted with the temporary master key (3. M1 and M2 generation). The message M1 is generated with the pieces of information marked with "★" in FIG. 2A, for example. The message M2 is generated with the pieces of information marked with "●" in FIG. 2A, for example.

Referring now to FIG. 2B, the master ECU 100 generates an MAC of data M1+M2 generated by combining the message M1 and the message M2 (4. Generation of MAC (M3) of M1+M2). The master ECU 100 generates an MAC, using MASTER_ECU_KEY, which is the temporary master key stored in advance. The master ECU 100 then transmits the generated messages M1 and M2 and the generated MAC M3 (MAC_A) to the target ECU 200a (5. M1, M2, and M3 transmission). Although the process between the master ECU 100 and the target ECU 200a will be described below, the same process is to be performed between the master ECU 100 and the target ECU 200c.

Figure 2C:
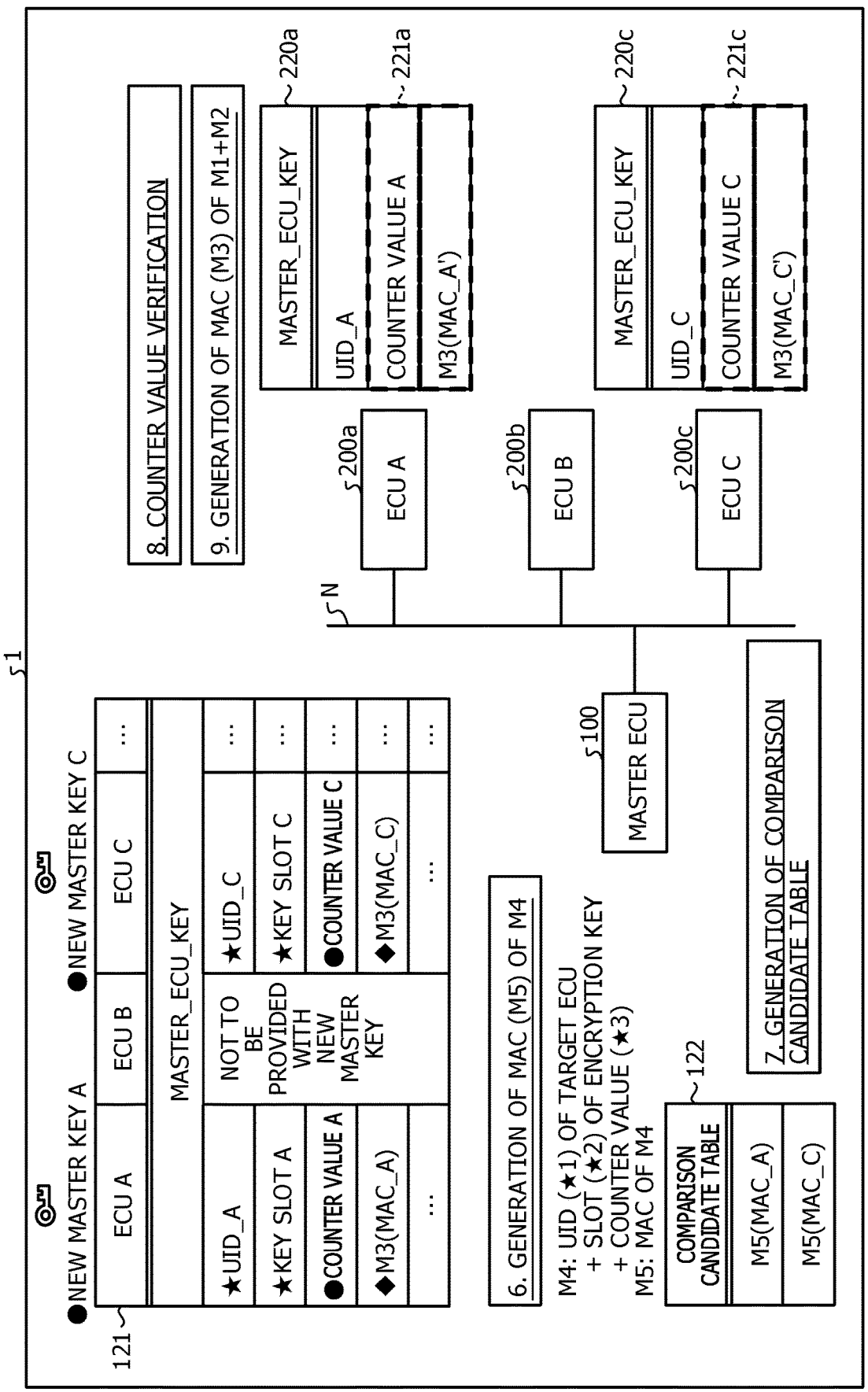
FIG. 2C is a diagram illustrating an example of an encryption key distribution process according to the first embodiment.

Referring now to FIG. 2C, the master ECU 100 generates M4 corresponding to the target ECU 200a, using the UID "UID_A", "key slot A", and "counter value A" of the target ECU 200a, which are stored in the target ECU 200a. The master ECU 100 then generate M5 (MAC_A), which is an MAC of the generated M4, using MASTER_ECU_KEY (6. Generation of MAC (M5) of M4).

For all the target ECUs 200 that have transmitted the master key update request, the master ECU 100 generates M5 in the same manner, and stores all the generated M5 into a comparison candidate table storage unit 122 (7. Generation of comparison candidate table).

Next, a master key reception process to be performed by a target ECU 200 is described. Although a process in the target ECU 200a will be described below, the same process is to be performed by the target ECU 200c. The target ECU 200*b* that has not transmitted the master key update request does not receive any master key, and therefore, does not perform the same process.

First, upon receipt of M1, M2 and M3 from the master ECU 100, the target ECU 200*a* verifies whether the counter value contained in M2 is valid (8. Counter value verification). In a case where the target ECU 200*a* verifies that the counter value is valid, the target ECU 200*a* generates M3 (MAC_A'), which is an MAC of the data M1+M2 generated by combining the received M1 and M2 (9. Generation of MAC of M1+M2). Like the master ECU 100, the target ECU 200*a* also generates the MAC, using the temporary master key MASTER_ECU_KEY stored in advance.

Figure 2D:
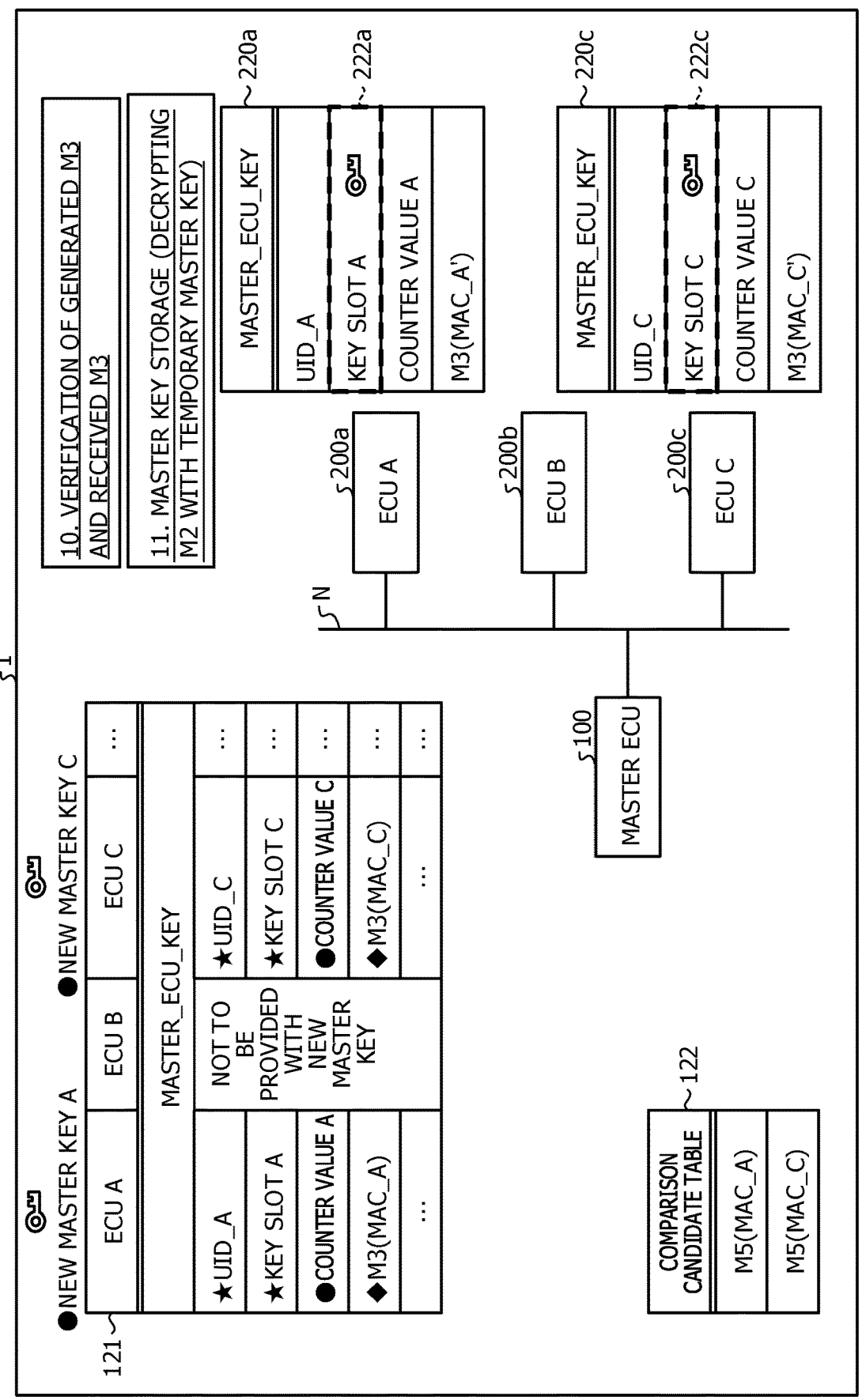
FIG. 2D is a diagram illustrating an example of an encryption key distribution process according to the first embodiment.

Referring now to FIG. 2D, the target ECU 200*a* verifies whether the M3 (MAC_A) received from the master ECU 100 matches the generated M3 (MAC_A') (10. Verification of generated M3 and received M3). Since M3 (MAC_A) and M3 (MAC_A') are both generated with the same MASTER_ECU_KEY, the target ECU 200*a* verifies that the received M3 is not valid in a case where the generated M3 and the received M3 do not match. In a case where the target ECU 200*a* verifies that M3 is valid, the target ECU 200*a* decrypts the received M2 with the temporary master key, and stores the new master key into the key slot A (11. Master key storage (Decrypting M2 with temporary master key)).

Figure 2E:
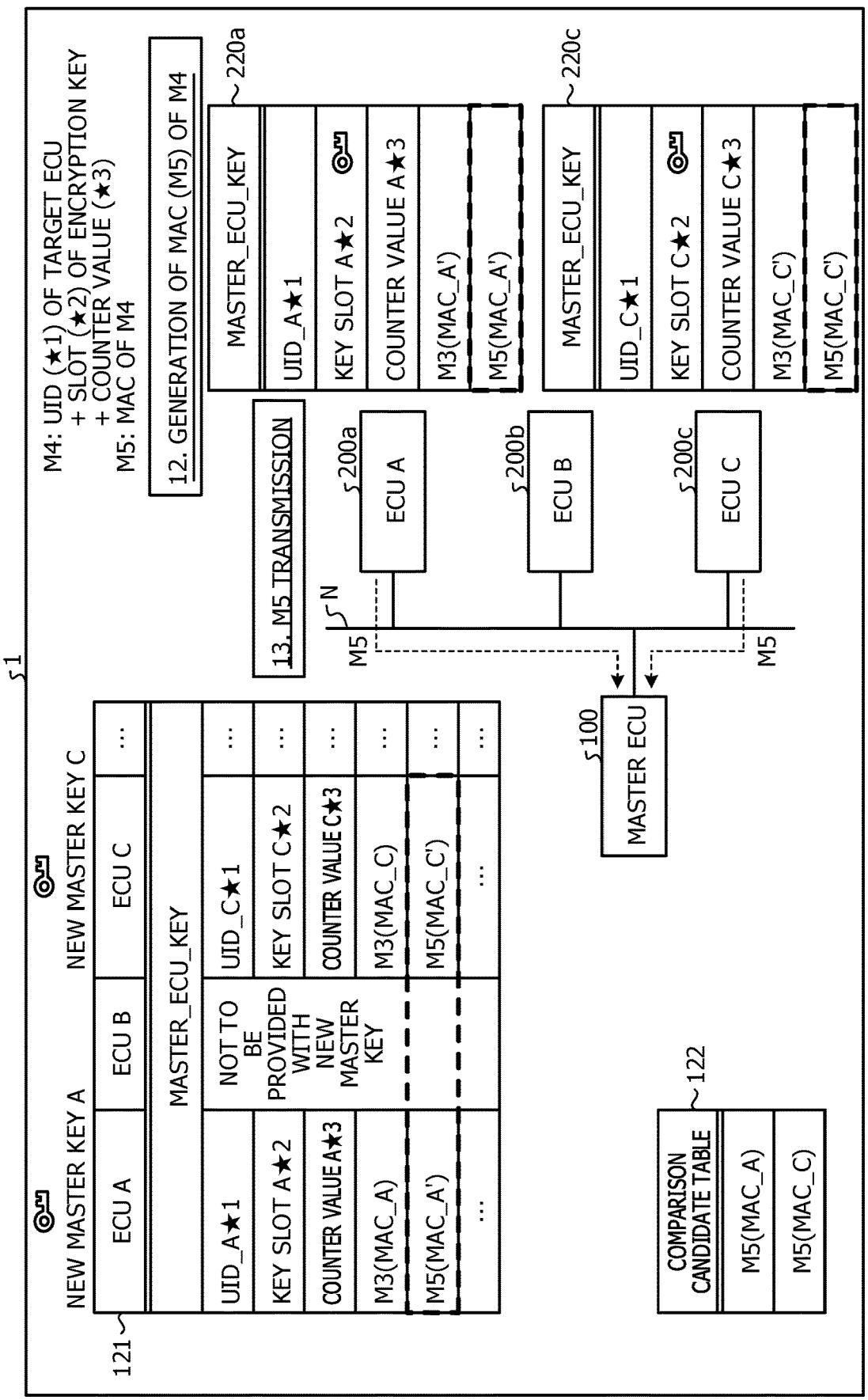
FIG. 2E is a diagram illustrating an example of an encryption key distribution process according to the first embodiment.

Referring now to FIG. 2E, the target ECU 200*a* generates a message M4, using "UID_A", which is the UID of the target ECU 200*a*, "key slot A", which is the key slot, and the counter value A. The target ECU 200*a* then generates M5 (MAC_A'), which is an MAC of the generated M4, using MASTER_ECU_KEY (12. Generation of MAC (M5) of M4). The message M4 is an example of an encryption key data set, and M5 is an example of encryption key verification data.

The target ECU 200*a* then transmits only M5 to the master ECU 100 (13. M5 transmission). In doing so, the target ECU 200*a* does not transmit M4.

Figure 2F:
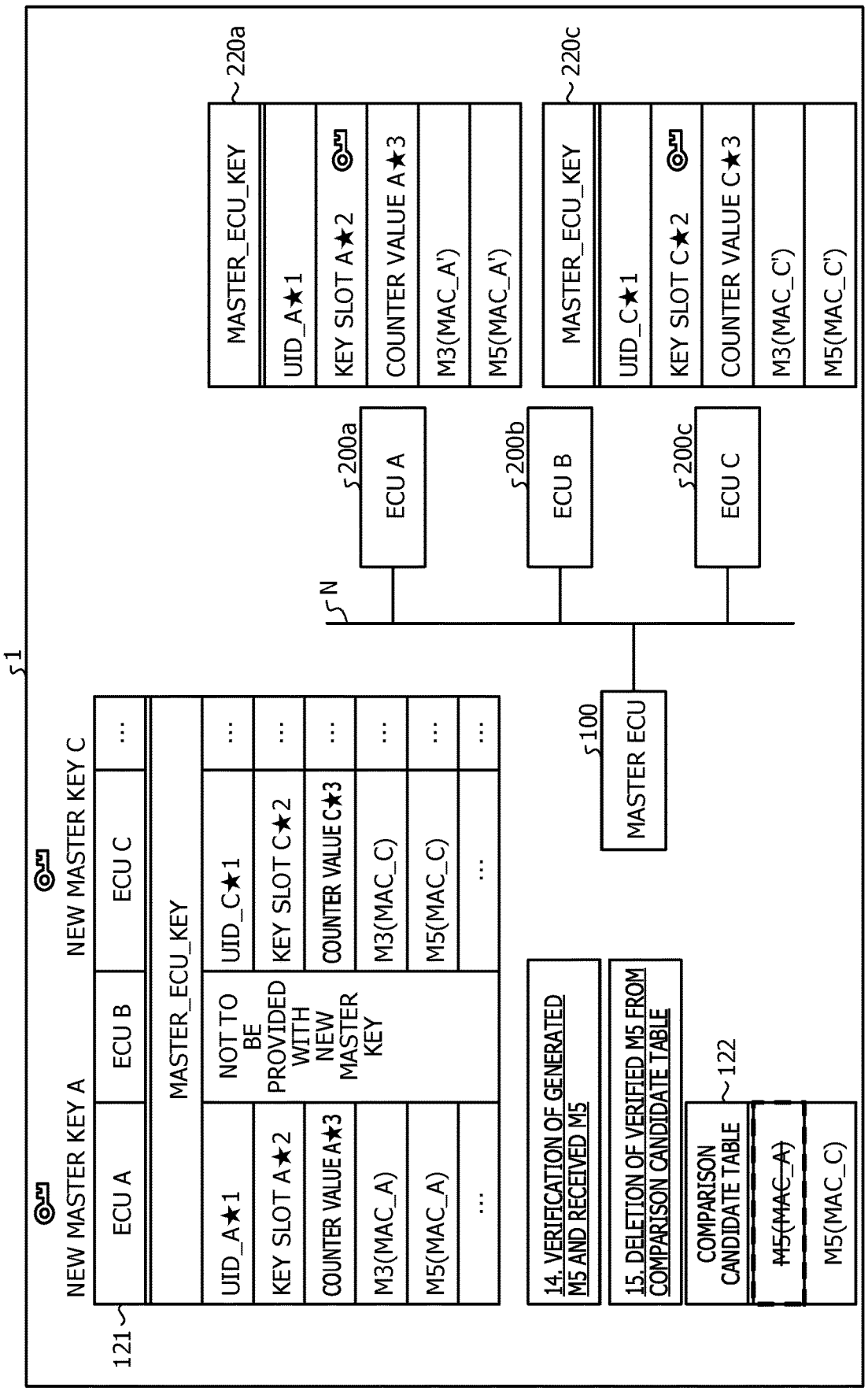
FIG. 2F is a diagram illustrating an example of an encryption key distribution process according to the first embodiment.

Referring now to FIG. 2F, the master ECU 100 that has received M5 stores the received M5 (MAC_A') into the ECU list storage unit 121. At this stage, the master ECU 100 does not receive the message M4 from the target ECU 200*a*, and therefore, is unable to identify that the target ECU 200 that has transmitted M5 corresponds to the target ECU 200 corresponding to which UID. The master ECU 100 then verifies whether M5 (MAC_A') received from the target ECU 200 matches any of the M5s stored in the comparison candidate table (14. Verification of generated M5 and received M5). For example, the master ECU 100 compares the received M5 with the M5s in the comparison candidate table stored in the comparison candidate table storage unit 122 in a brute-force manner.

Like M3 (MAC_A) and M3 (MAC_A'), the received M5 (MAC_A') and the M5s (MAC_A) in the comparison candidate table are generated with the use of MASTER_ECU_KEY, which is the master key stored in advance. For this reason, in a case where M5 (MAC_A) that matches the received M5 (MAC_A') is not stored in the comparison candidate table, for example where the received M5 does not match any M5 in the comparison candidate table, the master ECU 100 verifies that the received M5 is not valid.

In a case where the M5 (MAC_A) that matches the received M5 (MAC_A') is stored in the comparison candidate table, for example where the master ECU 100 verifies that the received M5 (MAC_A') is valid, the master ECU 100 deletes the M5 (MAC_A) from the comparison candidate table. As a result, the master ECU 100 confirms that the master key distribution process for the target ECU 200*a* has been properly completed (15. Deletion of verified M5 from comparison candidate table). The master ECU 100 repeats the procedures 14 and 15 until verifying that the M5s received from all the target ECUs 200 that have transmitted the master key update request are valid. For example, in a case where all the M5s stored in the comparison candidate table are deleted, the master ECU 100 ends the process.

As described above, in the encryption key distribution system according to this embodiment, an ECU as a distribution destination of a CAN encryption key update transmits only verification data without transmitting the data set corresponding to the distributed encryption key, and the distribution source ECU compares the received verification data with the verification data stored in the distribution source ECU. Thus, communication volume is reduced.

Functional Blocks

Referring back to FIG. 1, the functional blocks of the respective devices are described. As illustrated in FIG. 1, the master ECU 100 includes a communication unit 110, a storage unit 120, and a control unit 130. The communication unit 110 transmits data output from control unit 130 to the target ECUs 200 through the network N. The communication unit 110 also outputs data received from the target ECUs 200 through the network N, to the control unit 130.

The storage unit 120 stores a program to be executed by the control unit 130, for example, and various kinds of data such as the temporary master key. The storage unit 120 also includes the ECU list storage unit 121, the comparison candidate table storage unit 122, and a log storage unit 123. The storage unit 120 is equivalent to a semiconductor memory element such as a random access memory (RAM), a read only memory (ROM), or a flash memory, or a storage device such as a hard disk drive (HDD).

The ECU list storage unit 121 stores information about each target ECU 200, as illustrated in FIG. 2A. As illustrated in FIG. 2A, the ECU list storage unit 121 stores the UID of each target ECU 200, information about the key slot, and the counter value, which are associated with one another. The ECU list storage unit 121 further stores M3 and M5 for each target ECU 200, as illustrated in FIG. 2E. As illustrated in FIG. 2A, the ECU list storage unit 121 may store information about the target ECU 200 that has not transmitted the master key update request. The information stored in the ECU list storage unit 121 is registered beforehand by an acquisition unit 131 described later, and is sequentially updated by the acquisition unit 131 and a generation unit 132 described later.

As illustrated in FIG. 2E, the comparison candidate table storage unit 122 stores M5s that have been generated by the master ECU 100 and correspond to the respective target ECUs 200 that have transmitted the master key update request. Further, as illustrated in FIG. 2F, each M5 stored in the comparison candidate table storage unit 122 is deleted when a verification unit 134 described later verifies that the received corresponding M5 (MAC_A') is valid. The information stored in the comparison candidate table storage unit 122 is registered by the generation unit 132 described later, and is sequentially deleted by the verification unit 134.

The log storage unit 123 stores logs such as information about various kinds of events in the encryption key distribution process. For example, the log storage unit 123 stores the result of verification of validity of a received M5 and the like. The information stored in the log storage unit 123 is registered by the verification unit 134, for example. The log storage unit 123 is only roughly illustrated.

Referring back to FIG. 1, the control unit 130 is a processing unit that supervises the overall processes to be performed by the master ECU 100, and is a processor, for example. The control unit 130 includes the acquisition unit 131, the generation unit 132, an encryption key output unit 133, and the verification unit 134. The acquisition unit 131, the generation unit 132, the encryption key output unit 133, and the verification unit 134 are an example of electronic circuits included in the processor, and an example of processes to be executed by the processor.

The acquisition unit 131 receives a master key update request from a target ECU 200 through the communication unit 110, and outputs an instruction to generate an encryption key to the generation unit 132. The acquisition unit 131 also receives M5 from the target ECU 200 through the communication unit 110, and outputs an instruction to verify the received M5 to the verification unit 134.

When receiving an output of an encryption key generation instruction from the acquisition unit 131, the generation unit 132 generates an encryption key. The generation unit 132 also generates a message M1, using the UID of the target ECU 200 and information about the key slot, which are stored beforehand in the ECU list storage unit 121. The generation unit 132 encrypts the master key with the temporary master key, and generates a message M2, using the counter value, various flags, and the encrypted master key. The generation unit 132 generates M3, which is an MAC of data generated by combining the generated M1 and M2. The generation unit 132 then outputs the generated M1, M2, and M3 to the encryption key output unit 133.

The generation unit 132 further generates M4 relating to the target ECU 200, using the UID of the target ECU 200, the information about the key slot, and the counter value, which are stored beforehand in the ECU list storage unit 121. The generation unit 132 then generates M5, which is an MAC of the generated M4, and stores the M5 into the comparison candidate table storage unit 122.

The encryption key output unit 133 transmits the M1, M2, and M3 output from the generation unit 132, to the target ECU 200 through the communication unit 110.

Receiving an output of a verification instruction from the acquisition unit 131, the verification unit 134 verifies whether the received M5 matches any of the M5s stored in the comparison candidate table storage unit 122. In a case where the received M5 does not match any of the M5s stored in the comparison candidate table storage unit 122, the verification unit 134 verifies that the received M5 is not valid, and discards the received M5. In a case where the received M5 matches one of the M5s stored in the comparison candidate table storage unit 122, the verification unit 134 verifies that the received M5 is valid, and deletes the M5 matching the received M5 from the comparison candidate table storage unit 122. The verification unit 134 stores the result of the verification of the received M5, into the log storage unit 123.

Meanwhile, as illustrated in FIG. 1, each target ECU 200 includes a communication unit 210, a storage unit 220, and a control unit 230. The communication unit 210 transmits data output from control unit 230 to the master ECU 100 through the network N. The communication unit 210 also outputs data received from the master ECU 100 through the network N, to the control unit 230.

The storage unit 220 stores a program to be executed by the control unit 230, for example, and various kinds of data such as the temporary master key. The storage unit 220 also includes a counter 221 and a key slot 222. The storage unit 220 is equivalent to a semiconductor memory element such as a RAM, a ROM, or a flash memory, or a storage device such as an HDD.

The counter 221 stores a replay counter value that is information for detecting a retransmission attack, as indicated by reference numeral 221a in FIG. 2C. The key slot 222 stores the master key distributed from the master ECU 100, as indicated by reference numeral 222a in FIG. 2D.

The control unit 230 is a processing unit that supervises the overall processes to be performed by the target ECU 200, and is a processor, for example. The control unit 230 includes an output unit 231, an encryption key acquisition unit 232, and an encryption key verification unit 233. The output unit 231, the encryption key acquisition unit 232, and the encryption key verification unit 233 are an example of electronic circuits included in a processor, and an example of processes to be executed by the processor.

The output unit 231 transmits a master key update request to the master ECU 100 through the communication unit 210. The output unit 231 outputs a master key update request at a time when an instruction from the user (not illustrated) of the target ECU 200 is issued, a predetermined event occurs, or a predetermined time has elapsed, for example. The output unit 231 also transmits M5 output from the encryption key verification unit 233 to the master ECU 100 through the communication unit 210.

The encryption key acquisition unit 232 acquires M1, M2, and M3 transmitted from the master ECU 100 through the communication unit 210, and outputs the M1, M2, and M3 to the encryption key verification unit 233.

Upon receipt of the output of M1, M2 and M3 from the encryption key acquisition unit 232, the encryption key verification unit 233 decrypts M2 with the temporary master key, and refers to the counter 221 to verify whether the counter value is valid. In a case where the encryption key verification unit 233 verifies that the counter value is not valid, the encryption key verification unit 233 discards the received M1, M2, and M3.

In a case where the encryption key verification unit 233 verifies that the counter value is valid, the encryption key verification unit 233 generates a MAC of M1 and M2. The encryption key verification unit 233 then determines whether the generated MAC matches the received M3.

The MAC generated by the encryption key verification unit 233 and the M3 received from the master ECU 100 are both generated with the use of the M1 and M2 and the temporary master key. Accordingly, in a case where the generated MAC and the received M3 do not match, the encryption key verification unit 233 verifies that the received M3 is not valid.

In a case where the generated MAC and the received M3 do not match, the encryption key verification unit 233 discards the received M1, M2, and M3. In a case where the generated MAC matches the received M3, on the other hand, the encryption key verification unit 233 decrypts the new master key from M2, and stores the new master key into the key slot 222. The encryption key verification unit 233 also generates a message M4, using the UID of the encryption key verification unit 233, the counter value of the counter 221, and information about the key slot 222. The encryption key verification unit 233 then generates M5, which is an MAC of the generated message M4, and outputs the M5 to the output unit 231.

Process Flow

Figure 3:
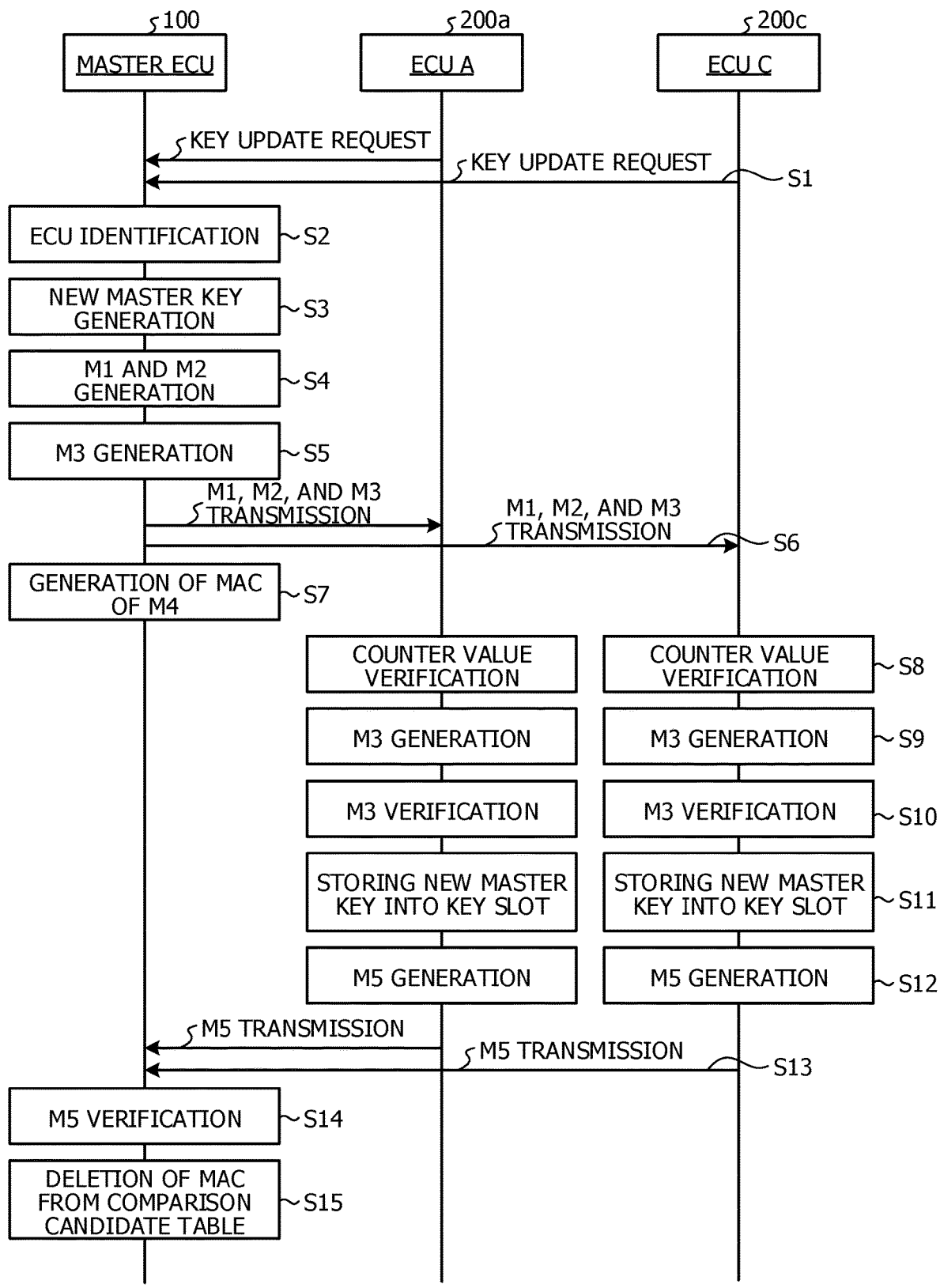
FIG. 3 is a sequence diagram illustrating an example of an encryption key distribution process according to the first embodiment.

Next, the encryption key distribution process to be performed by the encryption key distribution system 1 according to this embodiment is described. FIG. 3 is a sequence diagram illustrating an example of the encryption key distribution process according to the first embodiment. As illustrated in FIG. 3, the output units 231 of ECU_A and ECU_C, which are target ECUs 200, transmit a key update request to the master ECU 100 (S1).

Upon receipt of the key update request, the acquisition unit 131 of the master ECU 100 outputs an encryption key generation instruction to the generation unit 132. The generation unit 132 refers to the ECU list storage unit 121, to identify the target ECUs 200 that have transmitted the key update request (S2). The generation unit 132 also generates new master keys to be distributed to the target ECUs 200 (S3).

The generation unit 132 then generates messages M1 and M2, using the information stored in the ECU list storage unit 121 (S4). The generation unit 132 then generates M3, which is a MAC of data generated by combining the generated M1 and M2, and outputs the generated M1, M2, and M3 to the encryption key output unit 133 (S5). The encryption key output unit 133 transmits the M1, M2, and M3 output from the generation unit 132 to ECU_A and ECU_C, which are the target ECUs 200 that have transmitted the key update request (S6).

The generation unit 132 also generates a message M4, using the UIDs of the target ECUs 200, the encryption key slots, and the counter values, which are stored in the ECU list storage unit 121. The generation unit 132 then generates the MAC (M5) of M4, and stores the MAC (M5) into the comparison candidate table storage unit 122 (S7).

The encryption key acquisition unit 232 of each of the target ECUs 200 receives the M1, M2, and M3 from the master ECU 100, and outputs the M1, M2, and M3 to the encryption key verification unit 233. The encryption key verification unit 233 decrypts the M2 output from the encryption key acquisition unit 232, and refers to the counter 221, to verify whether the counter value is valid (S8). In a case where the encryption key verification unit 233 verifies that the counter value is valid, the encryption key verification unit 233 generates an MAC of the output M1 and M2 (S9). The encryption key verification unit 233 then verifies whether the generated MAC matches the output M3 (S10).

In a case where the encryption key verification unit 233 verifies that the generated MAC matches the output M3, the encryption key verification unit 233 stores the new master key obtained by decrypting the M2 into the key slot 222 (S11). The encryption key verification unit 233 then generates a message M4, using the UID of the encryption key verification unit 233, the encryption key slot, and the counter value. The encryption key verification unit 233 then generates M5, which is an MAC of M4 (S12), and outputs the M5 to the output unit 231. The output unit 231 transmits the M5 output from the encryption key verification unit 233, to the master ECU 100 (S13). At this stage, the output unit 231 does not transmit the message M4.

The acquisition unit 131 of the master ECU 100 receives the M5 from the target ECU 200, and outputs the M5 to the verification unit 134. The verification unit 134 then verifies whether the received M5 matches the M5 output from the acquisition unit 131 (S14). In a case where the verification unit 134 verifies that the generated MAC (M5) of M4 matches the M5 output from the acquisition unit 131, the verification unit 134 deletes the MAC (M5) of M4 stored in the comparison candidate table storage unit 122 (S15).

Figure 4:
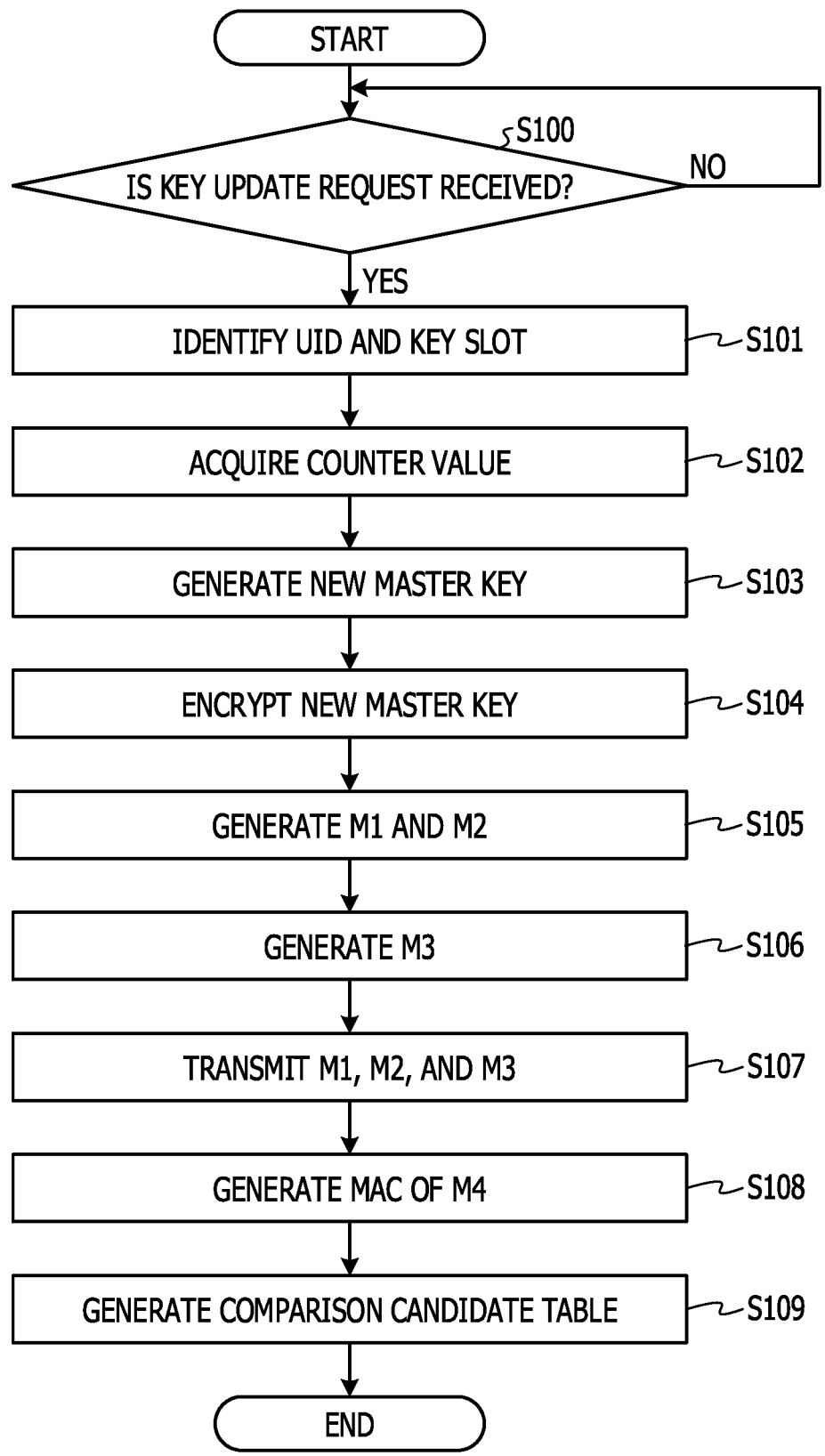
FIG. 4 is a flowchart illustrating an example of an encryption key transmission process according to the first embodiment.
Figure 5:
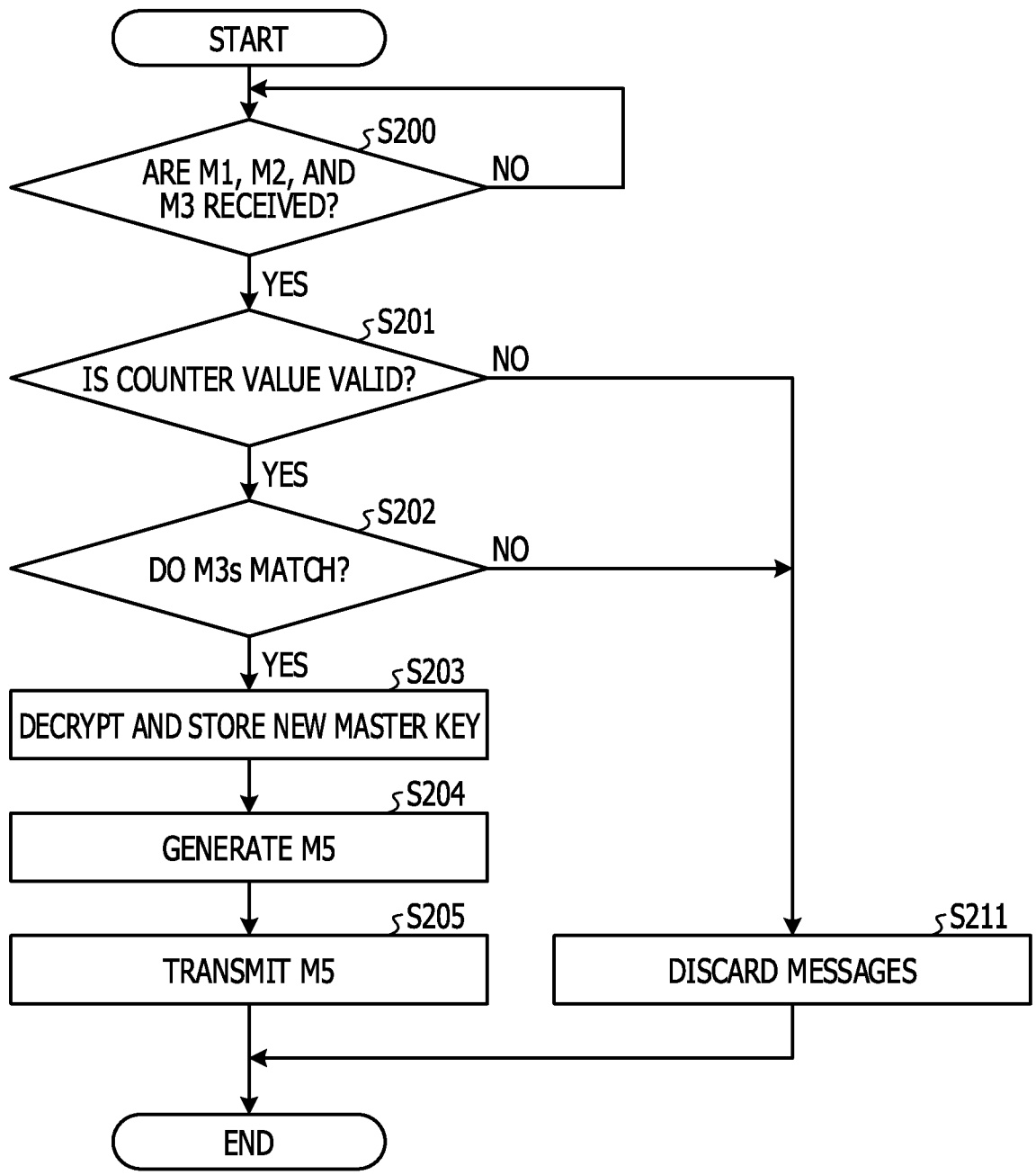
FIG. 5 is a flowchart illustrating an example of an encryption key reception process according to the first embodiment.
Figure 6:
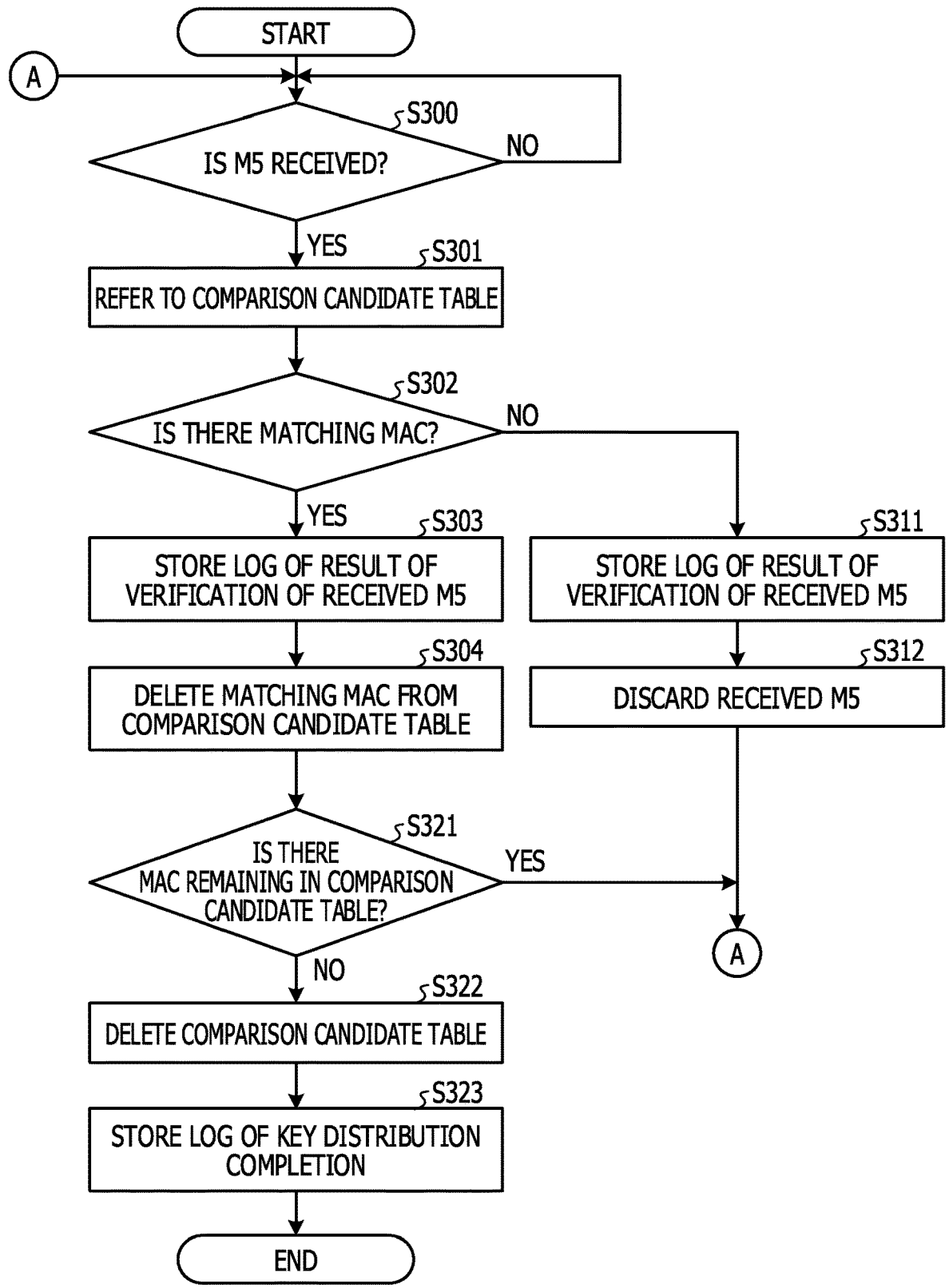
FIG. 6 is a flowchart illustrating an example of a distribution verification process according to the first embodiment.

Next, processes in the respective devices are described, with reference to FIGS. 4 through 6. FIG. 4 is a flowchart illustrating an example of an encryption key transmission process according to the first embodiment. As illustrated in FIG. 4, the acquisition unit 131 of the master ECU 100 stands by until receiving a key update request from a target ECU 200 (S100: No). When the acquisition unit 131 receives a key update request through the communication unit 110 (S100: Yes), the acquisition unit 131 outputs an encryption key generation instruction to the generation unit 132. The generation unit 132 refers to the ECU list storage unit 121, and identifies the UID and the key slot of the target ECU 200 that has transmitted the key update request (S101).

The generation unit 132 then refers to the ECU list storage unit 121, and acquires the counter value of the target ECU 200 (S102). The generation unit 132 then generates a new master key (S103), and encrypts the new master key using the temporary master key (S104).

The generation unit 132 then generates messages M1 and M2 by referring to the ECU list storage unit 121 (S105). The generation unit 132 further generates M3, which is an MAC of the generated messages M1 and M2 (S106). The generation unit 132 then outputs the generated M1, M2, and M3 to the encryption key output unit 133. The encryption key output unit 133 transmits the M1, M2, and M3 output from the generation unit 132, to the target ECU 200 that has transmitted the key update request, through the communication unit 110 (S107).

The generation unit 132 then refers to the ECU list storage unit 121, and generates a message M4, using the UID, the encryption key slot, and the counter value of the target ECU 200 that has transmitted M5. The generation unit 132 then generates an MAC of the generated M4 (S108). The generation unit 132 then stores the generated MAC of M4 into the comparison candidate table storage unit 122, and generates a comparison candidate table (S109). Through the above process, a new master key is transmitted from the master ECU 100 to the target ECU 200 that has transmitted the key update request.

Next, a data reception process to be performed by the target ECU 200 is described, with reference to FIG. 5. FIG. 5 is a flowchart illustrating an example of an encryption key reception process according to the first embodiment. As illustrated in FIG. 5, the encryption key acquisition unit 232 of the target ECU 200 that has transmitted the key update request stands by until receiving the M1, M2, and M3 from the master ECU 100 (S200: No). Upon receipt of the M1, M2, and M3 (S200: Yes), the encryption key acquisition unit 232 outputs the M1, M2, and M3 to the encryption key verification unit 233.

The encryption key verification unit 233 decrypts the M2 output from the encryption key acquisition unit 232. The encryption key verification unit 233 then refers to the counter 221, and verifies whether the counter value contained in the decrypted M2 is valid (S201). If the encryption key verification unit 233 verifies that the counter value is not valid (S201: No), the encryption key verification unit 233 discards the messages M1, M2, and M3 (S211), and ends the process.

If the encryption key verification unit 233 verifies that the counter value is valid (S201: Yes), the encryption key verification unit 233 generates an MAC of M1 and M2. The encryption key verification unit 233 then verifies whether the generated MAC matches the M3 (S202). If the encryption key verification unit 233 verifies that the generated MAC and the M3 do not match (S202: No), the encryption key verification unit 233 discards the messages M1, M2, and M3 (S211), and ends the process.

If the encryption key verification unit 233 verifies that the generated MAC matches the M3 (S202: Yes), the encryption key verification unit 233 stores the new master key obtained by decrypting the M2 into the key slot 222 (S203). The encryption key verification unit 233 then generates a message M4, using the UID of the encryption key verification unit 233, the encryption key slot, and the counter value. The encryption key verification unit 233 then generates M5, which is an MAC of the M4 (S204), and outputs the M5 to the output unit 231. The output unit 231 transmits the M5 output from the encryption key verification unit 233 to the master ECU 100 (S205). Through the above process, the target ECU 200 stores the new master key transmitted from the master ECU 100, and transmits the M5, which is verification data, to the master ECU 100.

Next, a verification process in the master ECU 100 is described, with reference to FIG. 6. FIG. 6 is a flowchart illustrating an example of a distribution verification process according to the first embodiment. As illustrated in FIG. 6, the acquisition unit 131 of the master ECU 100 stands by until receiving the M5 as the verification data from the target ECU 200 (S300: No). Upon receipt of the M5 through the communication unit 110 (S300: Yes), the acquisition unit 131 outputs an M5 verification instruction to the verification unit 134.

The verification unit 134 then refers to the comparison candidate table storage unit 122, and verifies whether the MAC of the M4 that matches the M5 output from the acquisition unit 131 is stored in a brute-force manner (S301). If the verification unit 134 verifies that the MAC of the M4 that matches the M5 is not stored (S302: No), the verification unit 134 stores, into the log storage unit 123, information indicating that the verification related to the received M5 has failed (S311). The verification unit 134 then discards the received M5 (S312), returns to S200, and stands by until receiving a new M5.

If the verification unit 134 verifies that the MAC of the M4 that matches the M5 is stored (S302: Yes), the verification unit 134 stores, into the log storage unit 123, information indicating that the verification related to the received M5 has been successful (S303). The verification unit 134 then deletes the MAC of the M4, which matches the received M5, from the comparison candidate table storage unit 122 (S304).

The verification unit 134 then determines whether there is an MAC of M4 remaining in the comparison candidate table storage unit 122 (S321). If the verification unit 134 determines that there is a remaining MAC of M4 (S321: Yes), the verification unit 134 returns to S300, and stands by until receiving a new M5. If the verification unit 134 determines that there is no remaining MAC of M4 (S321: No), the verification unit 134 deletes the comparison candidate table stored in the comparison candidate table storage unit 122 (S322). The verification unit 134 then stores, into the log storage unit 123, information indicating that the process of distributing a key to the target ECU 200 that has transmitted the key update request has been completed (S323), and ends the process. Through such a process, the master ECU 100 verifies whether key distribution to the target ECU 200 has been completed. In doing so, the target ECU 200 does not transmit M4 but transmits only M5, which is the MAC of M4, to the master ECU 100. Thus, the amount of data to be used for key update is reduced from 48 bytes to 16 bytes.

In this embodiment, the verification unit 134 verifies the M5 received from the target ECU 200 by performing brute-force comparison with the MAC of the M4 stored in the comparison candidate table storage unit 122. A brute-force comparison process in this embodiment is now described, with reference to FIG. 7. FIG. 7 is a diagram illustrating an example of a brute-force comparison process according to the first embodiment. FIG. 7 illustrates an example of a brute-force comparison process using a comparison candidate table generated in a case where key update requests are received from five target ECUs 200 of "UID_D" through "UID_H". In this case, five MAC values from a MAC value "D" through a MAC value "H" are stored in the comparison candidate table.

First, in a case where the verification unit 134 receives M5 whose MAC value is "D" from the target ECU 200 of "UID_D", the received MAC value "D" is compared with the five MAC values stored in the comparison candidate table in a brute-force manner. For example, the verification unit 134 performs a brute-force comparison process for the MAC value "D" up to five times. As a result, the verification unit 134 verifies that the MAC value "D" matches the received MAC value, for example, that a valid MAC value has been received. In this case, the verification unit 134 deletes the MAC value "D" from the comparison candidate table. For example, at this stage, four MAC values are stored in the comparison candidate table.

Next, in a case where the verification unit 134 receives M5 whose MAC value is "E" from the target ECU 200 of "UID_E", the received MAC value "E" is compared with the four MAC values stored in the comparison candidate table in a brute-force manner. For example, the verification unit 134 performs a brute-force comparison process for the MAC value "E" up to four times, and accordingly, the processing time becomes shorter than in the case with the MAC value "D".

The verification unit 134 verifies that the MAC value "E" matches the received MAC value, as in the above described case. In this case, the verification unit 134 deletes the MAC value "E" from the comparison candidate table, and accordingly, the number of MAC values stored in the comparison candidate table decreases to three.

In this manner, the number of MAC values stored in the comparison candidate table decreases each time a valid MAC value is received. As a result, the verification unit 134 reduces original "25 times", which correspond to the number of times of performing a brute-force MAC value comparison process to "15 times". Thus, it is possible to shorten the time to be taken by brute-force comparison.

Effects

As described above, in an encryption key distribution system including a key distribution ECU that transmits encryption keys and key reception ECUs that receive encryption keys, the key distribution ECU transmits an encryption key to a key reception ECU. The key distribution ECU also determines whether the encryption key transmission to the key reception ECU has been completed, on the basis of a result of determination as to whether verification data transmitted from the key reception ECU matches encryption key verification data calculated from a common key held in the key distribution ECU and the identifier of the key reception ECU. Further, in the encryption key distribution system, the key reception ECU records the received encryption key therein, calculates the verification data of the received encryption key from the common key stored therein and the identifier of the key reception ECU, and transmits the verification data of the received encryption key to the key distribution ECU. This reduces the amount of data to be used for key update.

The key distribution ECU also transmits encryption keys to a plurality of key reception ECUs that have transmitted a key request among the key reception ECUs, and determines from which key reception ECU the received verification data has been transmitted among the plurality of key reception ECUs that have transmitted the key request. By doing so, the key distribution ECU identifies the key reception ECU for which the key update has been completed.

The key distribution ECU also calculates encryption key verification data from the common key and the identifiers of a plurality of key reception ECUs to which encryption keys are to be transmitted, and stores the calculated encryption key verification data associated with the identifiers of the plurality of key reception ECUs into a verification data storage. In a case where it is determined that the stored verification data matches verification data received from a key reception ECU, the key distribution ECU deletes the matched verification data from the verification data storage. This reduces the time to be taken to verify whether key update has succeeded.

In a case where it is determined that all the verification data stored in the verification data storage has been deleted, the key distribution ECU determines that reception of encryption keys has been completed at the plurality of key reception ECUs that have transmitted the key request. Thus, the key distribution ECU readily recognizes completion of reception of encryption keys at all the key reception ECUs.

Further, each key reception ECU does not transmit an encryption key data set to the key distribution ECU. This reduces the amount of data to be used for key update.

The method of reducing the amount of data to be used for key update may be a method of not transmitting part of the message M4, or a method of reducing the data length of M5, for example. However, by the method of not transmitting part of the message M4, the amount of data to be reduced is small. If the data length of M5 is reduced, the guaranteed space becomes smaller, and the security strength becomes lower. According to this embodiment, it is possible to reduce the amount of data to be used for key update, without a decrease in security strength.

Second Embodiment

Although an embodiment of the present invention has been described above, the present invention may be implemented in various forms in addition to the above embodiment. For example, the number of master ECUs 100 and the number of target ECUs 200 in the encryption key distribution system 1 are not limited to the numbers illustrated in FIG. 1, and the encryption key distribution system 1 may include a plurality of master ECUs 100 and four or more target ECUs 200. Alternatively, one of the target ECUs 200 may also serve as the master ECU 100.

In the first embodiment, a configuration for distributing master keys has been described. However, the present invention is not limited to this, and may be a configuration for distributing encryption keys that are not master keys. In this case, to encrypt a key to be distributed, the generation unit 132 may use an existing master key, instead of the temporary master key.

The generation unit 132 may incorporate a hash value of the UID into the message M1, instead of the UID contained in the message M1. This further reduces the amount of data to be used for key update.

In a process of verifying whether a counter value is valid, the encryption key verification unit 233 may verify that the counter value is valid not only in a case where the received counter value matches the value of the counter 221, but also in a case where the difference between the two counter values is within a predetermined allowable range. In this case, the encryption key verification unit 233 may correct the value of the counter 221, depending on the received counter value.

Further, although this embodiment has been described through the encryption key distribution system 1 formed in one CAN, the present invention is not limited to this, and the encryption key distribution system 1 may be formed across a plurality of CANs. In this case, a plurality of master ECUs 100 may exist. Further, the respective master ECUs 100, or the master ECUs 100 and the target ECUs 200 may belong to different CANs. Furthermore, each target ECU 200 may share "CAN ID", which is the ID uniquely identifying the CAN, with the other target ECUs 200. Thus, it is possible to reduce the number of "CAN IDs", which is limited.

System

Further, each component of each device illustrated in the drawings is functionally conceptual, and therefore, the devices do not have to be physically configured as illustrated in the drawings. For example, specific aspects of separation and integration of the respective components are not limited to the illustrated forms, and all or some of the components may be functionally or physically separated and integrated in an arbitrary unit depending on various loads and usage states. For example, the acquisition unit 131 and the encryption key output unit 133 may be integrated. Alternatively, each output unit 231 may be separated into a processing unit that outputs an encryption key update request and a processing unit that outputs verification data. Further, all or some of the various processing functions to be executed by each device may be executed by a CPU (or a microcomputer such as an MPU or a micro controller unit (MCU)). Alternatively, all or some of the various processing functions may of course be executed by a program to be analyzed and executed by a CPU (or a microcomputer such as an MPU or an MCU) or hardware using wired logic.

Hardware

Figure 8:
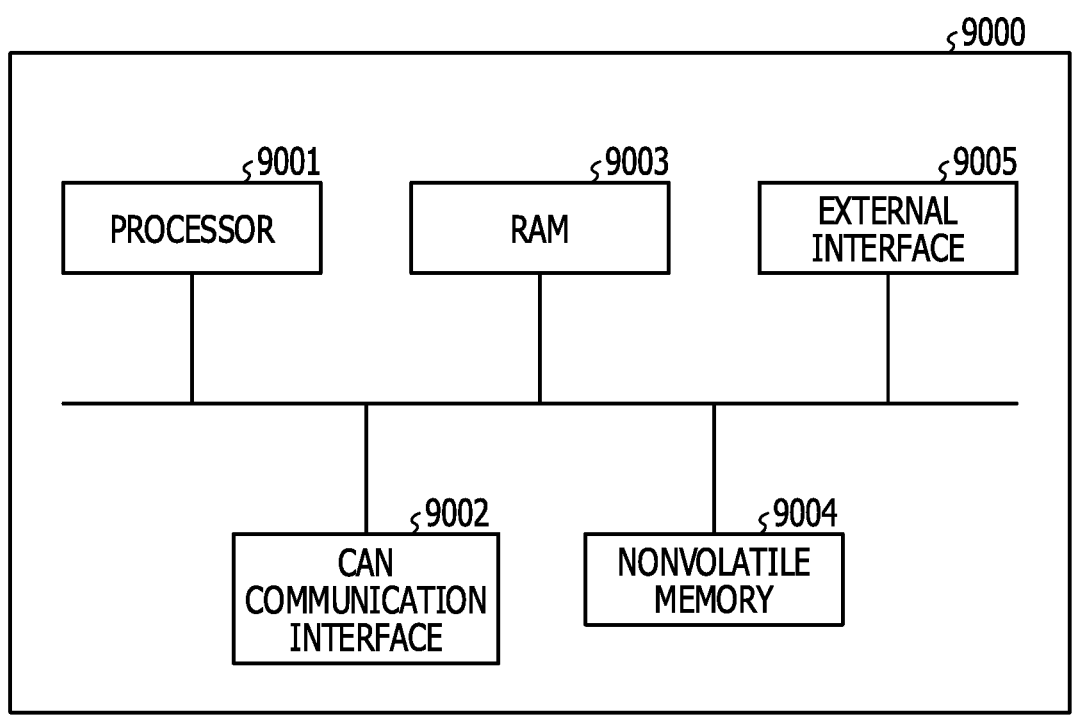
FIG. 8 is a diagram illustrating an example hardware configuration of an ECU.

Further, each target ECU 200 described in the above embodiments is formed with an electronic device such as a microcomputer mounted in a vehicle, for example. FIG. 8 is a diagram illustrating an example hardware configuration of an ECU. Although a target ECU 200 will be described as an example below, the master ECU 100 may also have the same hardware configuration.

As illustrated in FIG. 8, an electronic device 9000 includes a processor 9001, a CAN communication interface 9002, a RAM 9003, a nonvolatile memory 9004, and an external interface 9005. The processor 9001, the CAN communication interface 9002, the RAM 9003, the nonvolatile memory 9004, and the external interface 9005 are mounted on one chip, for example.

Examples of the processor 9001 include a CPU, a digital signal processor (DSP), an FPGA, and a programmable logic device (PLD). The CAN communication interface 9002 is a wired interface that controls communication with other ECUs. Examples of the RAM 9003 and the nonvolatile memory 9004 include RAMs such as synchronous dynamic random access memories (SDRAMs), ROMs, and flash memories. The external interface 9005 is a wired or wireless interface that controls communication with an external device controlled by a target ECU 200, for example.

The processor 9001 executes a program for achieving the same functions as the output unit 231, the encryption key acquisition unit 232, and the encryption key verification unit 233, for example. By doing so, the processor 9001 performs a process for achieving the same functions as the output unit 231, the encryption key acquisition unit 232, and the encryption key verification unit 233.

The master ECU 100 described in the above embodiments may also be formed with the same electronic device 9000. In this case, the processor 9001 that forms the master ECU 100 executes a program for achieving the same functions as the acquisition unit 131, the generation unit 132, the encryption key output unit 133, and the verification unit 134, for example. By doing so, the processor 9001 performs a process for achieving the same functions as the acquisition unit 131, the generation unit 132, the encryption key output unit 133, and the verification unit 134.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. An encryption key distribution system comprising:
a key distribution electronic control unit (ECU) that transmits an encryption key; and
a key reception electronic control unit (ECU) that receives the encryption key, wherein:
the key distribution ECU includes a first memory and a first processor and is configured to:
transmit the encryption key to the key reception ECU; and
determine completion of transmission of the encryption key to the key reception ECU, based on a result of determination as to whether first verification data which is transmitted from the key reception ECU matches second verification data of the encryption key, the second verification data of the encryption key being calculated by the key distribution ECU from key slot information transmitted with the encryption key to the key reception ECU by the key distribution ECU, a common key that is stored in the first memory, and an identifier of the key reception ECU, the key slot information indicating a storage location of the encryption key, and
the key reception ECU includes a second memory and a second processor and is configured to:
record the received encryption key in the second memory;
calculate the first verification data of the received encryption key from a same common key stored in the second memory that is the same as the common key stored in the second first memory and from the identifier of the key reception ECU; and
transmit the calculated first verification data to the key distribution ECU.

2. The encryption key distribution system according to claim 1, wherein
the key distribution ECU is configured to:
transmit the encryption key to a plurality of key reception ECUs that transmit a key request and includes the key reception ECU; and
determine from which key reception ECU the received first verification data is transmitted among the plurality of key reception ECUs that transmit the key request.

3. The encryption key distribution system according to claim 2, wherein
the key distribution ECU is configured to:
calculate the second verification data of the encryption key from the common key and respective identifiers of the plurality of key reception ECUs to which the encryption key is to be transmitted;
store the second verification data associated with the identifiers of the plurality of key reception ECUs into a verification data storage; and
when determining that the stored second verification data matches the first verification data which is transmitted from the key reception ECU, delete the matched second verification data from the verification data storage.

4. The encryption key distribution system according to claim 3, wherein, when determining that all the second verification data stored in the verification data storage are deleted, the key distribution ECU is configured to determine that reception of the encryption key is completed at the plurality of key reception ECUs that transmit the key request.

5. The encryption key distribution system according to claim 4, wherein each of the key reception ECU does not transmit a data set of the encryption key to the key distribution ECU.

6. A key distribution electronic control unit (ECU) that transmits an encryption key to a key reception electronic control unit (ECU), the key distribution ECU comprising:
a first memory; and
a first processor coupled to the first memory and configured to:
transmit the encryption key to the key reception ECU including a second memory and a second processor;
receive, from the key reception ECU, first verification data of the transmitted encryption key, the first verification data being calculated from a common key held by the key reception ECU and an identifier of the key reception ECU; and
determine completion of transmission of the encryption key to the key reception ECU, based on a result of a determination as to whether the received first verification data matches second verification data of the encryption key, the second verification data of the encryption key being calculated by the key distribution ECU from key slot information transmitted with the encryption key to the key reception ECU by the key distribution ECU, the same common key as the common key that is stored in the key distribution reception ECU, and the identifier of the key reception ECU, the key slot information indicating a storage location of the encryption key.

7. The key distribution electronic control unit according to claim 6, wherein
the first processor is configured to:
transmit the encryption key to a plurality of key reception ECUs that transmit a key request and includes the key reception ECU; and
determine from which key reception ECU the received first verification data is transmitted among the plurality of key reception ECUs that transmit the key request.

8. The key distribution electronic control unit according to claim 7, wherein
the first processor is configured to:
calculate the second verification data of the encryption key from the common key and respective identifiers of the plurality of key reception ECUs to which the encryption key is to be transmitted;
store the second verification data associated with the identifiers of the plurality of key reception ECUs into the first memory; and
when determining that the stored second verification data matches the first verification data which is transmitted from the key reception ECU, delete the matched second verification data from the first memory.

9. The key distribution electronic control unit according to claim 8, wherein, when determining that all the second verification data stored in the first memory are deleted, the processor is configured to determine that reception of the encryption key is completed at the plurality of key reception ECUs that transmit the key request.

10. A key reception electronic control unit (ECU) that receives an encryption key from a key distribution electronic control unit (ECU) that transmits the encryption key, the key reception ECU comprising:
a first memory; and
a first processor coupled to the first memory and configured to:
record the encryption key which is received from the key distribution ECU including a second memory and a second processor in the first memory;
calculate first verification data of the received encryption key from key slot information received with the encryption key from the key distribution ECU, a common key that is stored in the first memory, and an identifier of the key reception ECU, the first verification data confirming reception of the encryption key, the key slot information indicating a storage location of the encryption key; and
transmit the calculated first verification data to the key distribution ECU, wherein the first verification data is used by the key distribution ECU to determine completion of transmission of the encryption key to the key reception ECU, based on a result of a determination as to whether the received first verification data matches second verification data of the encryption key, the second verification data of the encryption key being calculated by the key distribution ECU from key slot information received with the encryption key by the key distribution ECU, the same common key as the common key that is stored in the first memory of the key reception ECU, and the identifier of the key reception ECU, the key slot information indicating a storage location of the encryption key.

11. The key reception electronic control unit according to claim 10, wherein the first processor does not transmit a data set of the encryption key t the key distribution ECU.

* * * * *